March 5, 1963    E. A. SCHWANDES    3,080,461
SECTIONALIZING SWITCH
Filed March 7, 1960    3 Sheets-Sheet 1
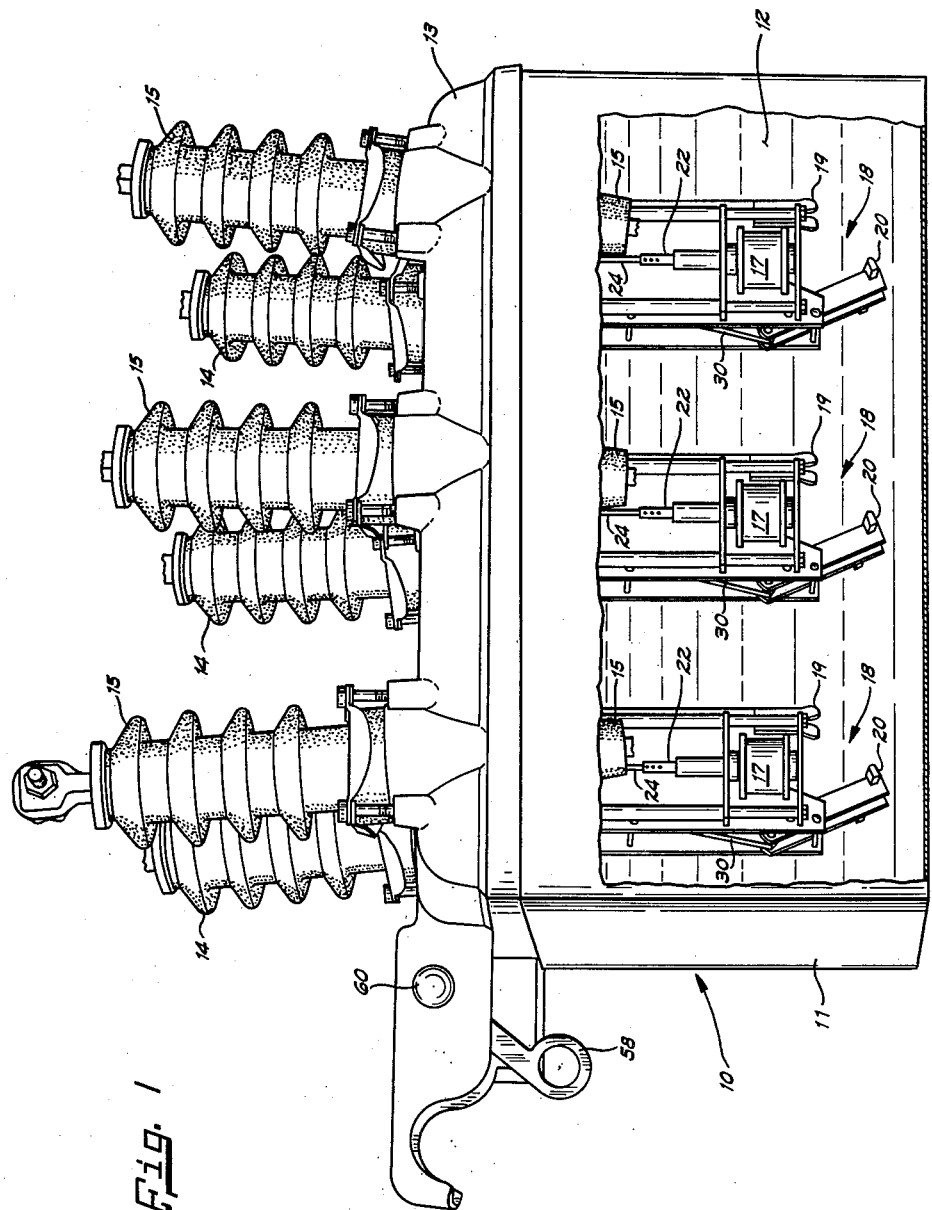
INVENTOR.
Elmer A. Schwandes
BY
Fred Wivrott
Attorney

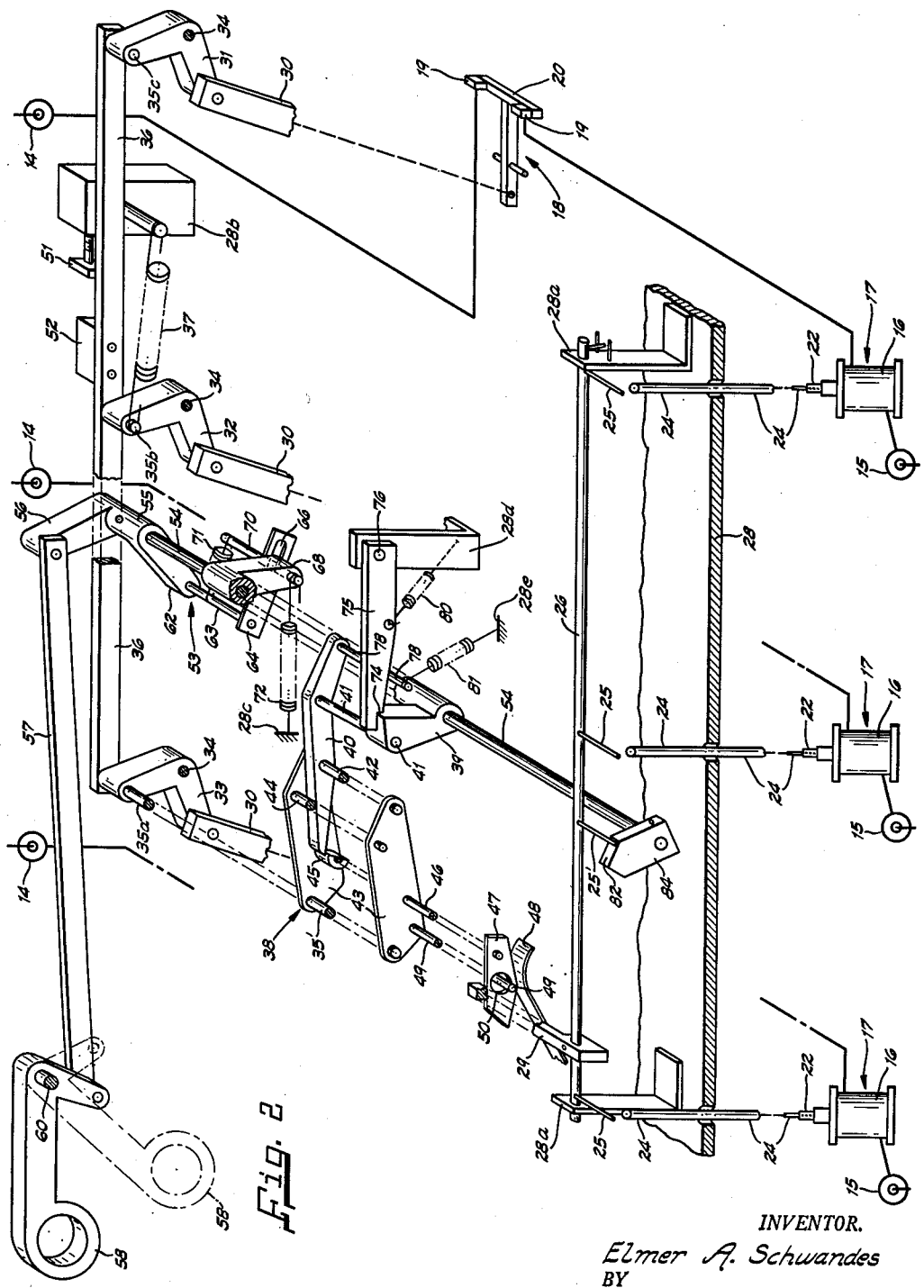

March 5, 1963 E. A. SCHWANDES 3,080,461
SECTIONALIZING SWITCH
Filed March 7, 1960 3 Sheets-Sheet 3
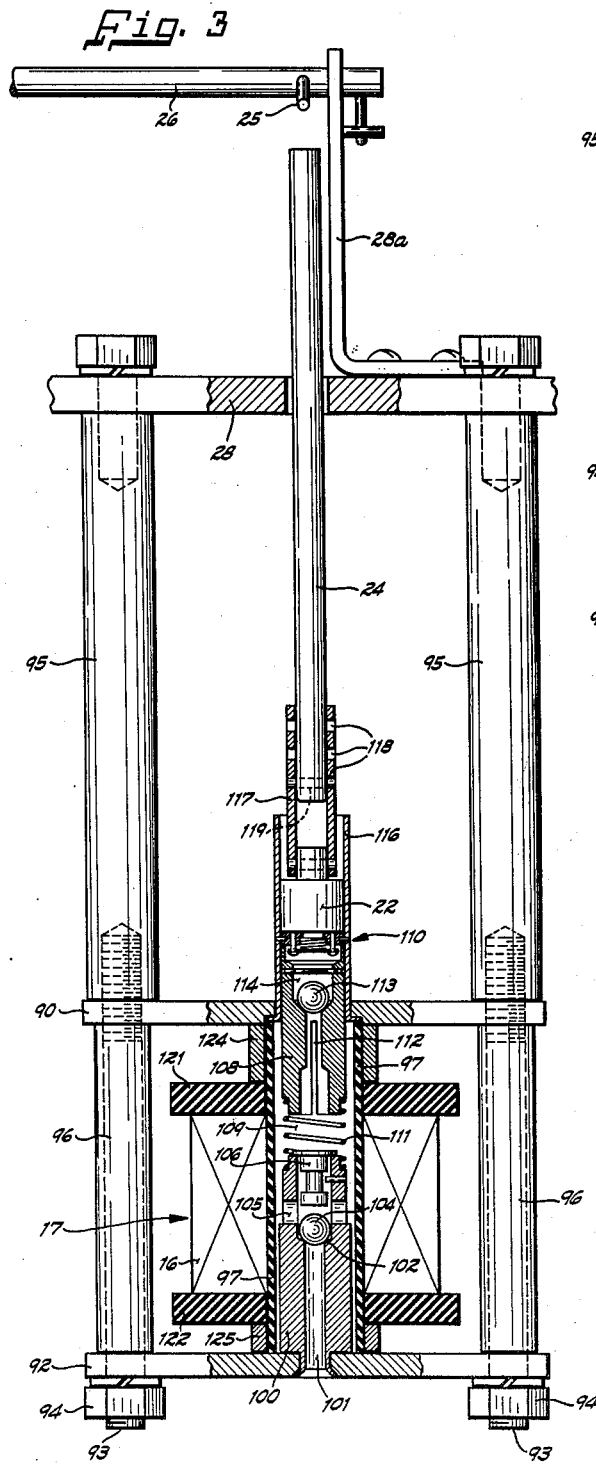
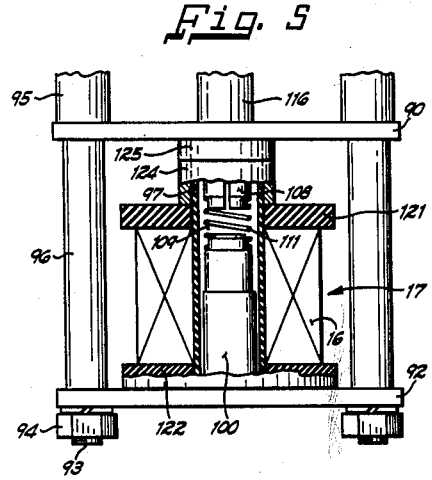
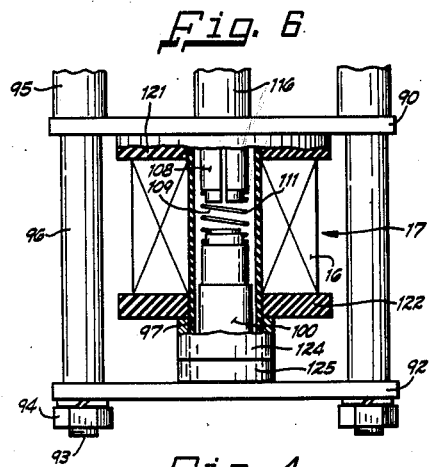
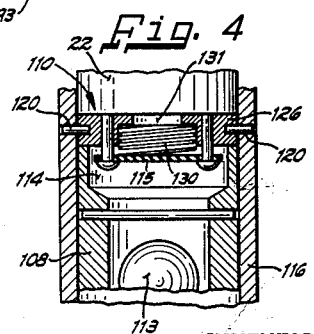
INVENTOR.
Elmer A. Schwandes
BY
Fred Wiviott
Attorney United States Patent Office 3,080,461
Patented Mar. 5, 1963

3,080,461
SECTIONALIZING SWITCH
Elmer A. Schwandes, Milwaukee, Wis., assignor to McGraw-Edison Company, Milwaukee, Wis., a corporation of Delaware
Filed Mar. 7, 1960, Ser. No. 13,305
4 Claims. (Cl. 200—107)

This invention relates to automatic electrical protective devices and, more particularly, to sectionalizing switches.

It is common practice in distribution systems to employ a recloser or other backup protective device in series with the main distribution line and located adjacent the source of power, and sectionalizer switches in feeder lines radiating from the main line. Because the majority of faults in such systems are temporary in nature, and will clear in a relatively short time, the backup protective devices are usually adjusted to execute a series of rapidly successive opening and reclosing operations upon the occurrence of a fault, during which time the sectionalizer switches remain closed. If the fault has not cleared after a predetermined number of such opening and reclosing operations, usually three, it is then considered permanent, in which case it must be isolated from the source. If the fault occurs in one of the feeder lines, its sectionalizer switch will open subsequent to the third opening operation of the recloser thereby isolating the fault from the source. For this purpose, sectionalizer switches are provided with fault integrating means which count the number of fault current impulses and then operate the sectionalizer switch's opening means, whereupon the faulted feeder line will be isolated from the main line while the circuit to the remaining feeder lines remains intact. This opening of the device's contacts takes place while the recloser is open, so that the sectionalizing switch is not required to have interrupting ability. After the sectionalizing switch in the faulted section has opened, the recloser closes again thereby restoring service to the nonfaulted feeder lines. If a permanent fault occurs in the main line, however, the sectionalizing switches will remain inactive while the recloser cycles to lockout, so that when service is restored in the main line, the feeder lines will be immediately energized.

One type of prior art sectionalizing switch utilizes a solenoid for sensing overcurrent impulses. When it is desired to change the current rating in this type of prior art sectionalizing switch, it is necessary to remove the current sensing coil and replace it with one having a different number of turns. This requires the manufacturer or utility to stock a large number of coils. In addition, because such coils are required to carry relatively large currents, they are generally wound with only a few turns of relatively heavy wire. As a result, in order to change their current ratings, it is necessary to modify them by as little as a fraction of a turn. This makes the calibration of such coils extremely difficult.

It is an object of the invention to provide a protective device having overcurrent responsive means with means for adjusting the sensitivity thereof whereby the minimum actuating current may be varied.

Another object of the invention is to provide a protective device having switch operating means including a coil and a magnetic plunger and having means for adjusting the initial relative positions thereof. It is a further object of the invention to provide indexing means for such protective devices wherein said coil and plunger may be located in any one of a plurality of predetermined relative positions so that the minimum current necessary for the attraction of said plunger can be selectively varied.

It is still another object of the invention to provide a protective device having an overcurrent coil and a magnetic actuating plunger wherein the coil is mounted for movement relative to the plunger so that the current rating of the device may be modified without changing current coils.

It is still a further object of the invention to provide a polyphase sectionalizing switch wherein a predetermined number of operations of a backup protective device in one of the phases will cause all of the phases to be operated.

These and other objects and advantages of the invention will become more apparent from the detailed description of the invention taken with the accompanying drawings in which:

FIG. 1 is a side elevational view with parts broken away of a polyphase sectionalizing switch embodying the instant invention;

FIG. 2 is an expanded schematic showing the operating mechanism of the polyphase sectionalizing switch illustrated in FIG. 1;

FIG. 3 is a side elevational view, partly in section, of integrating mechanism for the sectionalizing switch shown in FIG. 1;

FIG. 4 is an enlarged sectional view of a portion of the integrating mechanism shown in FIG. 3; and FIGS. 5 and 6 illustrate how the current sensing coil of the integrating mechanism shown in FIG. 3 may be adjusted.

Referring to the drawings in greater detail, FIG. 1 shows a three-phase sectionalizer switch 10 having a metallic tank 11 filled with a dielectric fluid 12, such as oil, and a cover 13 which supports incoming and outgoing porcelain bushings 14 and 15 respectively for connection to the line wires not shown. Bushings 14 and 15 extend interiorly of tank 11 beneath the level of the oil 12. In circuit between each pair of incoming and outgoing bushings are the current responsive solenoid coils 16 of an integrating mechanism 17 and the main switch means 18 comprising stationary contacts 19 and movable contacts 20.

The operation of the integrating mechanism 17 will be explained in greater detail hereinafter, it being sufficient at this point to state that each time a fault current traverses the solenoid coil 16 in any of the phases, an associated integrating piston 22 having a coaxial, upwardly extending, trip rod 24 will be moved vertically upward a predetermined distance.

A common switch latching, tripping and resetting mechanism which is disposed beneath cover 13, is illustrated schematically in FIG. 2 and will now be discussed. This mechanism includes a trip shaft 26 journalled for rotation in stationary supports 28a mounted on a supporting frame 28. Extending laterally from trip shaft 26 are a plurality of trip pins 25, one of which lies in the path of each of the trip rods 24. Should a fault current traverse one of the coils 16 a predetermined number of times, usually three, its trip rod 24 will be moved upward a sufficient distance to engage its associated trip pin 25 thereby rotating trip shaft 26 in a clockwise direction as viewed from the right in FIG. 2. This pivots a rocking arm 29 affixed to the left end of trip shaft 26 to effect tripping of the sectionalizing switch in a manner to be described hereinafter.

The main switch means 18 of each phase is operated through the agency of an insulating link 30 by an associated, pivotally connected bell crank 31, 32 or 33 each of which is adapted to pivot on a fixed pivot 34 and each is further pivotally connected by pins 35a, 35b and 35c respectively, to a common connecting bar 36. A switch opening spring 37 extends between pin 35b and frame portion 28b. Under normal circuit conditions, when the sectionalizer switch is closed as shown in FIG. 2, the opening spring 37 tends to shift the connecting bar 36 to the right and thereby rotate bell cranks 31, 32 and 33 simultaneously in a clockwise direction to open each of main switch means 18. Such opening action is, however, normally prevented by a collapsible general latch means or toggle linkage assembly generally designated by the reference numeral 38.

When the sectionalizer switch is closed, the toggle linkage assembly 38 effects a rigid connection between bell crank 33 and a reset latch arm 39, which is normally latched and participates in a resetting operation to be explained below. The toggle linkage assembly 38 includes a long link 40 pivotally connected near its midpoint by a pivot pin 41 to the reset latch arm 39 and by a second pivot pin 42 to a pair of toggle plates 43 which are affixed by pins 42, 44 and 35a and which are pivotally connected to bell crank 33 by pin 35a. Long link 40 is normally restrained in the position shown in FIG. 2 by a hemispherical latch member 45 that is rotatably mounted between toggle plates 42 on shaft 46. The tendency for toggle plates 43 to rotate in a counterclockwise direction under the influence of opening spring 37 is normally prevented by cross pin 44 which engages the upper surface of long link 40 and which along with latch 45 and pivot pin 42 forms a rigid connection therebetween.

Shaft 46 extends past the outer surface of the frontmost toggle plate 43 and carries a trip arm 47 at its outer end. A leaf spring 48 mounted on frame 28 urges trip arm 47 into the position shown in FIG. 2 thereby holding member 45 in its latched position. A second pin 49, extending from the front-most toggle plate 43 cooperates with an oversized aperture 50 in trip arm 47 to form a limit stop for the latter.

It will be appreciated from the foregoing discussion that, when trip shaft 26 is rotated, rocking lever 29 will pivot trip arm 47 in a counterclockwise direction to rotate latch 45 until the end of long link 40 is enabled to bypass its flat surface. This breaks the rigid connection between long link 40 and toggle plates 43, freeing pivot pin 35a for movement to the right under the influence of opening spring 37, whereby connecting bar 36 is moved to the right and bell cranks 31, 32 and 33 are pivoted in a clockwise direction to open the main switch means 18. Movement of connecting bar 36 is limited by an adjustable stop 51 mounted in frame portion 28b and lying in the path of a stop block 52 carried by connecting bar 36.

The resetting assembly indicated generally by the reference numeral 53 includes a resetting shaft 54 that is rotatably mounted in frame 28 about a fixed axis and a resetting crank 55 affixed thereto. The upper arm 56 of crank 55 is pivotally connected to one end of a long link 57 whose other end is pivotally connected to an operating handle 58 that is mounted for rotation on a shaft 60 affixed to the cover 13. The lower arm 62 of resetting crank 54 is connected by a pin 63 to one end of a link 64 which has an elongate slot 66 formed in its other end.

Reset latch arm 39 is rotatably mounted about resetting shaft 54 and has an operating arm 68 integral therewith and extending downward therefrom. The lower end of operating arm 68 carries a pin 70 which extends into the slot 66 carried by link 64. A first spring 71, extending between pins 63 and 70, biases pin 70 toward the left end of slot 66 and a second spring 72 extending between pin 70 and frame portion 28c, urges reset latch arm 39 toward rotation in a clockwise direction. When the sectionalizing switch is in its latched position as shown in FIG. 2, such rotation is prevented by a latch 74 carried on one end of a latch arm 75 that is pivotally mounted at its other end 76 on frame portion 28d.

It will be recalled that when the toggle linkage assembly 38 is tripped by the rotation of trip bar 26, long link 40 rotates in a counterclockwise direction around the pivot pin 41 in resetting arm 39. As long link 40 pivots, a pin 78 extending transversely from its righthand end, as viewed in FIG. 2, engages latch arm 75 and pivots it in a clockwise direction against the restraining force of a spring 80. This releases reset arm 39 and operating arm 68 for rotation in a clockwise direction about resetting shaft 59 under the influence of spring 72. The pin 70 carried at the lower end of operating arm 68 engages the lefthand end of slot 66 to rotate operating crank 55 in a clockwise direction thereby moving link 57 toward the right and rotating operating handle 58 in a clockwise direction to its phantom position shown in FIG. 2.

In addition, rotation of resetting arm 39 in a clockwise direction moves long link 40 to the right whereby toggle plates 43 are also displaced through the agency of pin 42. This brings long link 40 and toggle plates 43 back into alignment. As toggle plates 43 move toward the right, trip arm 47 is also carried to the right out of engagement with rocking lever 29. However, its engagement with the curved upper surface of spring 48 returns latch 45 to its latching position whereupon its cylindrical surface is again engaged by the end of long link 40. In this manner, the toggle linkage 38 is automatically reset in preparation of a closing operation. A small spring 81 extending between pin 78 and frame portion 28e may be provided to enhance the realignment of long link 40 and toggle plates 43.

When the device is to be reset, operating handle 58 is moved upwardly to its full position shown in FIG. 2, thereby moving a link 57 to the left and rotating operating crank 55 in a counterclockwise direction. Upon this event, the left end of slot 66 will engage pin 70 to rotate operating arm 68 and reset arm 39 in a counterclockwise direction. This moves long link 40 to the left as its pivotal axis moves with resetting arm 39. Because a rigid connection again exists between long link 40 and toggle plates 43, pin 35a will also be moved to the left thereby rotating bell cranks 31, 32 and 33 about their pivotal axes 34. This motion continues until the upper edge of resetting arm 39 engages latch 74 whereupon the device is reset and the main switch means 18 reclosed.

If it is desired to trip the device manually, operating handle 58 is pulled downwardly against the force of spring 71 from its full to its phantom position in FIG. 2 to rotate operating crank 55 and operating shaft 54 in a clockwise direction thereby bringing the beveled upper end 82 of a manual trip arm 84 into engagement with a trip pin 25'. This rotates trip shaft 26 to cause tripping in the manner discussed with respect to normal operation. The slot 66 in arm 64 allows operating crank 55 to be rotated while operating arm 68 and resetting lever 39 remain stationary. Conversely, slot 66 also allows arm 68 to rotate while crank 55 remains stationary so that the device may be tripped open when handle 58 is restrained in its upper position.

In the foregoing discussion it was stated that each time one of the overload sensing coils 16 was traversed by a fault current, its associated integrating piston 22 was moved upward a predetermined distance. This function is performed by the integrating mechanism 17, shown in detail in FIG. 3. The assembly 17 is supported between a pair of plates 90 and 92 that are mounted by studs 93 and nuts 94 at the lower end of a pair of posts 95 depending from frame 28. The correct spacing between plates 90 and 92 is provided by sleeves 96 which are disposed therebetween and which surround studs 93.

Also disposed between plates 90 and 92 and secured to each in a hermetically sealed relationship is a tube 97 which supports coil 16 and which also acts as a hydraulic cylinder. Located in the lower end of tube 97 is a magnetic pole member 100 secured to lower plate 92 and having an axial bore 101 extending therethrough for placing the interior of tube 97 in communication with the ambient oil. The upper portion 102 of bore 100 is recessed to provide a seat for a ball check valve 104, while a dampening member 106 is loosely mounted in the upper end of recessed portion 102 for limiting the movement of ball 104. In addition, a pair of lateral ports 105 are provided in each side of portion 102 so that oil may flow freely through bore 101 and to the interior of tube 92 when ball 104 is in an elevated position.

A magnetic plunger 108 is located in tube 97 above magnetic member 100 and separated therefrom by a gap 109 in which a compression spring 111 is disposed. Magnetic plunger 108 is also provided with an axial bore 112 and has a ball check valve 113 in its recessed upper portion 114. Secured to the upper end of tube 97 is a tubular extension and guide member 116 for receiving the upper end of magnetic plunger 108. An impulse valve assembly 110 is affixed by pins 120 in tubular extension 116 above magnetic plunger 108 and is shown in FIG. 4 to include a body portion 126, a check plate 115 reciprocably mounted below the aperture 131 formed in body portion 126 and a compression spring 130 which normally urges plate 115 away from said aperture. This impulse valve assembly 110 tends to prevent oil from surging upward through aperture 131 when plunger 108 is drawn rapidly down and also acts as a stop for said plunger.

Referring again to FIG. 3, it can be seen that the integrating piston 22 resides in tubular extension 116 above valve 110 and includes a tubular stem 117 extending upwardly toward trip pin 25. Stem 117 which slidably receives the lower end of trip rod 24 is provided with a plurality of pairs of aligned openings 118. In addition, trip rod 24 is provided with a transverse aperture 119. It can be seen that by suitably securing the alignment of the aperture 119 in trip rod 24 with the appropriate pair of the openings 118 in tubular extension 117, the proximity of trip rod 24 to trip pin 25 can be adjusted. In this manner, the number of operations necessary to cause tripping can be regulated.

In operation, each time one of the current sensing coils 16 is traversed by an overload current, its magnetic plunger 108 will be attracted downwardly against the influence of compression spring 111. This holds ball 104 against its seat 102 so that the oil in gap 109 is forced through bore 112 and above ball 113. When the backup recloser operates to interrupt the fault current, the magnetic attraction between coil 16 and magnetic plunger 108 disappears, whereupon the compression spring 111 returns magnetic plunger 108 to its initial position shown in FIG. 3. As magnetic plunger 108 moves upwardly, ball 113 closes bore 112 so that the oil above said plunger is forced past impulse valve 110 and below integrating piston 22 forcing the latter upwardly a predetermined distance toward trip pin 25. In addition, this upward movement of plunger 108 draws ambient oil through bore 101, past ball 104, through lateral openings 105 and into gap 109. The size of the gap 109 will determine the amount of oil that is pumped below integrating piston 22 during each operation thereby controlling its incremental rise.

If the fault has not cleared during the first opening and reclosing operation of the backup recloser, the fault current will reappear in coil 16 attracting magnetic plunger 108 downwardly for the second time, whereby the pumping action just described is repeated, forcing integrating piston 22 upward a second predetermined incremental distance. If the fault has not cleared after a predetermined number of such operations, the upper end of trip rod 24 will engage trip pin 25 thereby operating the tripping mechanism in the manner described above.

As seen in FIG. 3, coil 16 is mounted on tube 97 and has upper and lower flanges 121 and 122 which are slidably mounted on tubular member 97. Coil 16 is positioned between the upper and lower plates 90 and 92 and hence relative to magnetic plunger 108 by means of upper and lower annular spacer members 124 and 125 which are slidably received on tubular member 97. It is noted that the axial length of the lower spacer member 125 is smaller than the axial length of the upper spacer member 124.

It will be appreciated by those skilled in the art that the magnetic force exerted between a coil and a magnetic plunger is a function of both the current flowing through said coil and the relative distance between their magnetic centers. It can be seen also that in order to move magnetic plunger 108 downwardly against the restraining force of spring 111, a certain minimum current will be necessary for each position of coil 16 relative to magnetic plunger 108. In other words, by decreasing the distance between the magnetic centers of magnetic plunger 108 and coil 16 the minimum current necessary to overcome spring 111 and initiate an integrating operation will also be decreased.

The relative positions of coil 16 and magnetic plunger 108 can be conveniently adjusted by the use of the spacer members 124 and 125. Thus, by removing nuts 96 and sliding lower plate 94 from studs 93, spacer members 124 and 125 and coil 16 may be removed from tube member 97. The device may then be reassembled with both spacer members between the upper flange 121 and the upper plate 90 as shown in FIG. 5, whereby the distance between coil 16 and magnetic plunger 108 is at a maximum so that a maximum initiating current is required. On the other hand, the device may be reassembled so that both of the spacer members are between lower flange 122 and the lower plate 92 as shown in FIG. 6, thereby substantially reducing the distance between coil 16 and magnetic plunger 108 so that only a relatively small initiating current is required. Also, assembly may be made with the smaller spacer 125 between upper plate 93 and upper flange 121 and the large spacer 124 between the lower flange 122 and lower plate 94. In the latter case, a smaller initiating current will be required than for the assembly pictured in FIG. 3 but larger than that shown in FIG. 6. It will also be appreciated that any combination of adjustments are available by further subdividing spacers 124 and 125. Hence, because the restoring force of spring 111 is constant and because the magnetic force exerted on plunger 108 by coil 16 is a function of both the current and the distance between the centers of these members, by adjusting this distance the minimum actuating current of the device can be correspondingly adjusted. As a result, a wide range of minimum actuating currents can be realized with the use of a single coil. In addition, by the use of spacer members 124 and 125 the coil 16 can be located accurately and conveniently in a plurality of predetermined positions relative to plunger 108 so that the current rating of the coil, i.e., the minimum current necessary to attract plunger 108, can be changed from one preselected value to another with some degree of precision.

It will be understood by those skilled in the art, that while the invention has been described with respect to one particular type of three phase protective device, it has application as well to other types of single phase and three phase devices as well.

In addition, while only a single embodiment of the invention has been shown and described, other modifications will become apparent once the inventive concept is known. Accordingly, it is intended to cover in the appended claims all such modifications which fall within the true spirit of the invention.

I claim:

1. In a device for protecting an electrical system, the combination of, main switch means and an overcurrent coil in circuit with said system, switch operating means including a magnetic plunger movable into said coil upon the occurrence of a fault current, frame means having first and second portions fixed in spaced apart relation, the distance between said portions being greater than the axial dimension of said coil, said coil being mounted for axial movement on said frame means relative to said plunger and between said first and second portions, a plurality of spacer means selectively mountable on said frame means between said coil and the fixed portions of said frame, the combined axial length of said spacer members being substantially equal to the difference between the axial length of said coil and the distance between said fixed portions, whereby the distance between said coil and plunger may be adjusted so that the minimum current required to move said plunger and thereby actuate said switch operating means may be varied between a plurality of preselected values.

2. A polyphase sectionalizing switch, each phase including an overcurrent coil and switch means, a common latch assembly for holding each of said switch means in closed position, each phase also including hydraulic integrating means having a hydraulic cylinder and a magnetic plunger reciprocable into said hydraulic cylinder upon the occurrence of a fault current through its associated overcurrent coil, said integrating means each being operable after a predetermined number of operations by its magnetic plunger to release said latch means and simultaneously open all of said switch means, frame means having a fixedly mounted portion, each of said overcurrent coils being individually mounted on said frame means for limited movement relative to its associated magnetic plunger, and indexing means including first and second coil positioning means each having a different predetermined length, said coil positioning means being selectively positionable between said coil and said fixed portion for selectively varying the initial distance between the coil and plunger in each phase in equal, predetermined distinct increments so that the minimum plunger actuating current for each coil may be adjusted.

3. A polyphase sectionalizing switch, each phase including an overcurrent coil and switch means, switch opening means, a common latch assembly for holding each of said switch means in closed position in opposition to said switch opening means, each phase also including hydraulic integrating means having a hydraulic cylinder and a magnetic plunger associated with one of said overcurrent coils and reciprocable into its hydraulic cylinder upon the occurrence of a fault current through said coil, a common trip bar movable in a first direction to engage said latch means and release said switch means for simultaneous movement toward their open position, frame means having first and second portions fixed in spaced relation, the distance between said portions being greater than the axial dimension of said coils, each of said overcurrent coils being mounted for axial movement on said frame means relative to its magnetic plunger and between said first and second portions, a plurality of spacer means selectively mountable on said frame means between each of said coils and said portions, the combined axial length of said spacer members and their associated coils being equal to the distance between said fixed portions, whereby the distance between each of said coils and its plunger may be adjusted so that the minimum current required to move each of said plungers and thereby actuate said switch operating means may be varied between a plurality of preselected equal distinct and discontinuous increments.

4. A polyphase sectionalizing switch, each phase including an overcurrent coil and switch means, switch opening spring means urging each of said switch means toward their open position, a common latch assembly for holding each of said switch means in closed position, each phase also including hydraulic integrating means having a hydraulic cylinder, a magnetic plunger associated with each overcurrent coil and reciprocable into one of said hydraulic cylinders upon the occurrence of a fault current through its associated overcurrent coil, an integrating piston associated with each phase, each of said integrating means being operable to force a quantity of hydraulic liquid below its integrating piston each time its magnetic plunger reciprocates to advance said piston a predetermined distance, a common trip bar lying in the path of each of said integrating pistons and constructed and arranged to release said latch means upon engagement by one of said pistons, frame means having a fixed portion, each of said overcurrent coils being individually mounted on said frame means for movement relative to its magnetic plunger, and indexing means including first and second coil positioning means each having a different predetermined length, said coil positioning means being selectively positionable between said coil and said fixed portion for selectively varying the initial distance between the coil and plunger in each phase in equal predetermined distinct increments so that the minimum plunger actuating current for each coil may be adjusted.

References Cited in the file of this patent
UNITED STATES PATENTS

| | | |
|---|---|---|
| 705,102 | Leonard et al. | July 22, 1902 |
| 1,273,045 | Downes et al. | July 16, 1918 |
| 2,295,691 | Russell | Sept. 15, 1942 |
| 2,331,114 | Finch | Oct. 5, 1943 |
| 2,464,303 | Gesellschap | Mar. 15, 1949 |
| 2,733,384 | Niebauer | Jan. 31, 1956 |
| 2,795,671 | Edwards | June 11, 1957 |
| 2,898,420 | Kuze | Aug. 4, 1959 |
| 2,908,780 | Walters | Oct. 13, 1959 |